United States Patent
Gao et al.

(10) Patent No.: US 10,502,835 B2
(45) Date of Patent: Dec. 10, 2019

(54) METHODS AND SYSTEMS FOR INHERENT FAST TIME TO FIRST POSITION FIX (TTFF) AND HIGH SENSITIVITY

(71) Applicant: UTI Limited Partnership, Calgary (CA)

(72) Inventors: Yang Gao, Calgary (CA); Wentao Zhang, Calgary (CA)

( * ) Notice: Subject to any disclaimer, the term of this patent is extended or adjusted under 35 U.S.C. 154(b) by 265 days.

(21) Appl. No.: 15/472,180

(22) Filed: Mar. 28, 2017

(65) Prior Publication Data

US 2017/0276792 A1 Sep. 28, 2017

Related U.S. Application Data

(60) Provisional application No. 62/314,096, filed on Mar. 28, 2016.

(51) Int. Cl.
  *G01S 19/08* (2010.01)
  *G01S 19/02* (2010.01)
  *G01S 19/07* (2010.01)

(52) U.S. Cl.
  CPC .............. *G01S 19/08* (2013.01); *G01S 19/02* (2013.01); *G01S 19/07* (2013.01)

(58) Field of Classification Search
  CPC .......... G01S 19/01; G01S 19/02; G01S 19/07; G01S 19/08

USPC ........... 342/357.395, 357.39, 357.44, 357.45
See application file for complete search history.

(56) References Cited

U.S. PATENT DOCUMENTS

| | | | | |
|---|---|---|---|---|
| 8,120,529 | B2* | 2/2012 | Bar-Sever | G01S 19/27 342/357.66 |
| 8,209,596 | B1* | 6/2012 | Gilmour | G01S 19/02 342/357.45 |
| 8,514,128 | B2* | 8/2013 | McBurney | G01S 19/27 342/357.66 |
| 9,007,261 | B2* | 4/2015 | Weng | G01S 19/27 342/357.25 |
| 9,140,561 | B2* | 9/2015 | Bagnall | G01S 19/20 |
| 9,739,888 | B2* | 8/2017 | Cheng | G01S 19/27 |
| 9,877,157 | B2* | 1/2018 | Lu | H04W 4/023 |
| 2015/0070213 | A1* | 3/2015 | Rezaei | G01S 19/27 342/357.66 |

* cited by examiner

*Primary Examiner* — Chuong P Nguyen

(57) ABSTRACT

Systems and methods for inherent fast Time To First position Fix (TTFF) and high sensitivity are described. An embodiment of a method may include interpolating a satellite position in response to a navigation message having initial conditions for satellite ephemeris data converted into Keplerian format, wherein signal fixation is maintained in response to receiving the navigation signal at least once per day.

19 Claims, 13 Drawing Sheets

METHODS AND SYSTEMS FOR INHERENT FAST TIME TO FIRST POSITION FIX (TTFF) AND HIGH SENSITIVITY

CROSS-REFERENCE TO RELATED APPLICATIONS

This application claims priority to, and the benefit of, U.S. Provisional Pat. App. No. 62/314,096 entitled "Methods and Systems for Inherent Fast Time to First Position Fix (TTFF) and High Sensitivity," filed on Mar. 28, 2016, the entire contents of which are incorporated herein by reference.

FIELD

This disclosure relates generally to navigation systems, and more specifically, to methods and systems for inherent fast Time To First position Fix (TTFF) and high sensitivity.

BACKGROUND

Even in the era of multiple GNSSs, it is still a big challenge for standalone GNSS user equipment (UE) to provide seamless, timely and reliable positioning information in some extremely weak-signal environments because of the difficulties of GNSS UEs in either obtaining the ranging information or decoding the navigation (NAV) messages from the weak GNSS signals. The performance of GNSS UEs working in such environments is often quantified through the Time to First Position Fix (TTFF) and signal acquisition/tracking sensitivities, namely the lowest signal levels at which signals can be acquired and tracked, which are highly dependent on the UE startup modes (cold/warm/hot) that are categorized in terms of the accuracy of initial time, location and availability of ephemeris.

For warm start—the most typical start mode, the TTFF typically ranges from 18 to tens of seconds on a standalone GPS device, usually consisting of signal acquisition, tracking, bit synchronization, frame synchronization, ephemeris decoding, measurements taking and position computation, in which ephemeris decoding accounts for the most part of TTFF and is the mostly sensitive to signal strength. For better navigation experience with GNSS UEs, fast TTFF and high sensitivity are always desperately desired.

Assisted GNSS (AGNSS) and Ephemeris Extension (EE) are the primary technologies that are widely used to improve the TTFF and sensitivity, attempting to provide alternative ephemeris from ground (or even space-borne) assisting systems to UEs when the GNSS signals are too weak to allow timely downloading of the NAV messages from the GNSS satellites, along with additional aiding information to expedite signal acquisitions.

However, both the above technologies have significant limitations. For AGNSS, it relies badly on network connectivity. Considering the life cycle of the aiding data from the AGNSS server, the UEs have to remain connected to the network so that the aiding data can be updated a certain period of time (say 2 hours for Assisted GPS (AGPS)). For EE, although the provided aiding data has longer life expectancy (for days), it can be hardly used in assisting tracking loop due to the difference between extended ephemeris and the actual ephemeris broadcast from the signals.

SUMMARY

Systems and methods for inherent fast Time To First position Fix (TTFF) and high sensitivity are described. An embodiment of a method may include interpolating a satellite position in response to a navigation message having initial conditions for satellite ephemeris data converted into Keplerian format, wherein signal fixation is maintained in response to receiving the navigation signal at least once per day.

In one embodiment, a method for generating satellite navigation messages includes determining an ephemeris data set in response to received global observations of a satellite vehicle, converting the ephemeris data set from Cartesian initial conditions to Keplerian initial conditions, encoding the Keplerian initial conditions into a navigation message, and uploading the navigation message to a satellite segment.

An embodiment of a method for relaying satellite navigation messages may include receiving a navigation message comprising an ephemeris data set converted from Cartesian initial conditions to Keplerian initial conditions, storing the navigation message, determining whether a reference time period has elapsed, retrieving the navigation message in response to a determination that the reference time period has elapsed, and broadcasting the navigation message.

An embodiment of a method for establishing a signal fixation on a satellite vehicle may include receiving a navigation message comprising an ephemeris data set converted from Cartesian initial conditions to Keplerian initial conditions, converting the Keplerian initial conditions back to Cartesian initial conditions, numerically integrating the Cartesian initial conditions, and interpolating a position for a satellite vehicle for a specified time in response to the numerically integrated the Cartesian initial conditions.

An embodiment of a system may include a control segment configured to: determine an ephemeris data set in response to received global observations of a satellite vehicle, convert the ephemeris data set from Cartesian initial conditions to Keplerian initial conditions, encode the Keplerian initial conditions into a navigation message, and upload the navigation message to a satellite segment. Additionally, the system may include a space segment configured to: receive a navigation message comprising an ephemeris data set converted from Cartesian initial conditions to Keplerian initial conditions, store the navigation message, determine whether a reference time period has elapsed, retrieve the navigation message in response to a determination that the reference time period has elapsed, and broadcast the navigation message. Additionally, the system may include a user equipment device configured to: receive a navigation message comprising an ephemeris data set converted from Cartesian initial conditions to Keplerian initial conditions, convert the Keplerian initial conditions back to Cartesian initial conditions, numerically integrate the Cartesian initial conditions and interpolate a position for a satellite vehicle for a specified time in response to the numerically integrated the Cartesian initial conditions.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

The limitations of prior systems described in the background above are related to design weakness in current GNSSs architecture, and more specifically the fact that the validity of NAV messages is too short—generally 1 to 2 hours. The present embodiments, however, fundamentally overcome these limitations by broadcasting described NAV messages, which contain the information of satellite orbits and clock with validity for a much longer period—one day or longer. When such embodiments of NAV messages are deployed in GNSS systems, as long as one set of the messages is successfully received once in a day for each satellite, the messages can be used in subsequent acquisition, tracking and position fixing without the same data expiry issues in the rest time of the day. In this way, the fast TTFF and high sensitivity on the GNSS UEs are enhanced with little or no reliance on additional assistance infrastructure, which would enable significant improvement and GNSS positioning performance.

Figure 1:
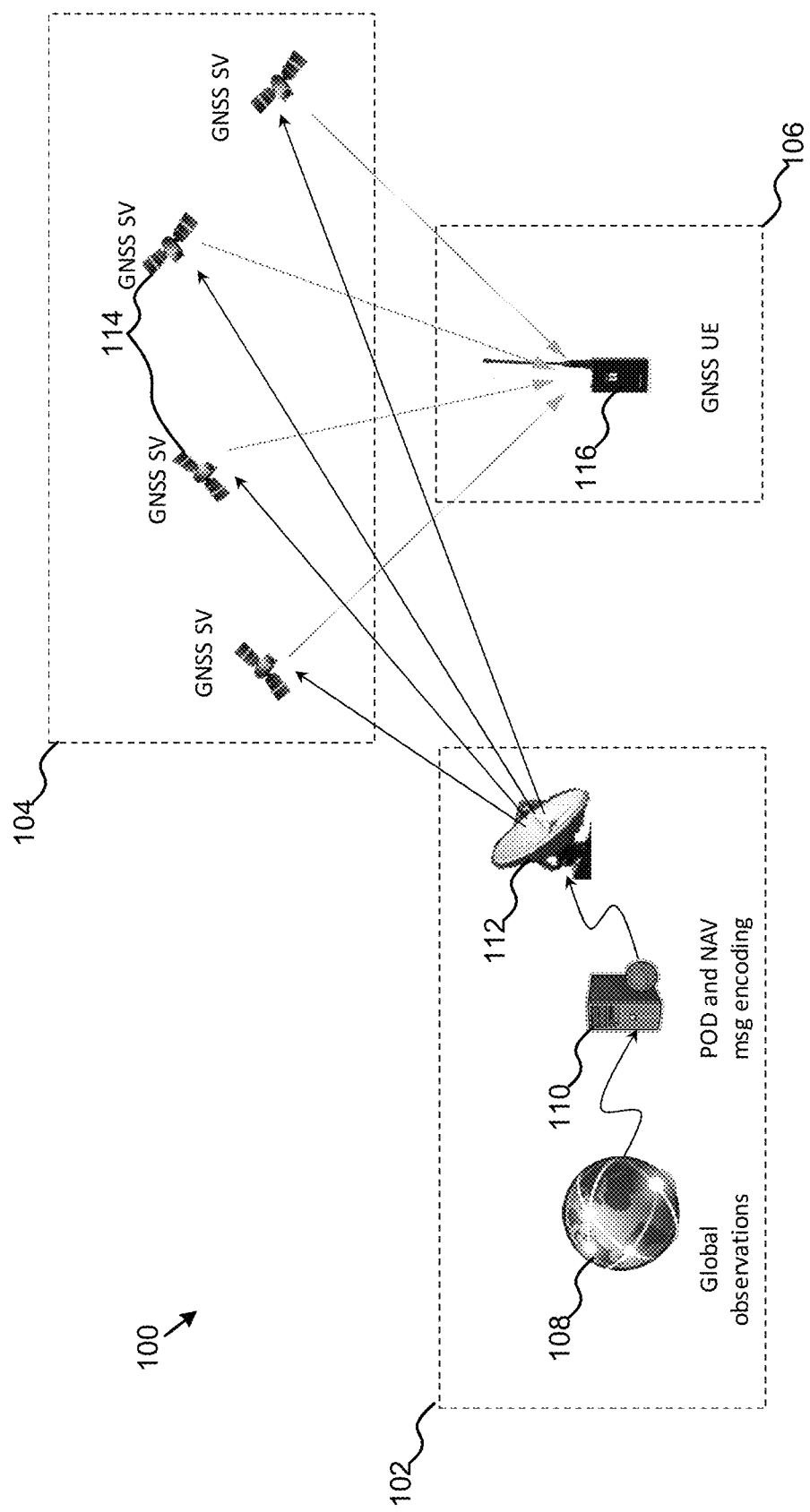
FIG. 1 is a schematic circuit diagram illustrating one embodiment of a system for inherent fast Time To First position Fix (TTFF) and high sensitivity.

The present embodiments include a system 100 as shown in FIG. 1 having a control segment (CS) 102, which may include a ground-based system including a system for global observations 108, a message generation and encoding system 110, and a ground terminal 112 for communication of the NAV messages to satellite systems 114. The system 100 may also include a space segment (SS) 104 comprising one or more satellite systems 114 configured to receive the NAV messages from the CS 102, and relay the NAV messages at predetermined intervals. Additionally, the system 100 may include an endpoint segment 106 including user equipment (UE) 116, such as GPS-enabled navigation devices, smartphones, position tracking devices, etc. The UE 116 may receive the relayed NAV messages from the SS 104, decode the NAV messages to determine initial conditions of the satellite position and velocity for a specified reference time, and calculate the position and velocity of the satellite system 114 relative to the UE 116 at any given time within a predetermined time period by numerically integrating the initial conditions. In an embodiment, the predetermined time period may be one day or more.

Figure 2:
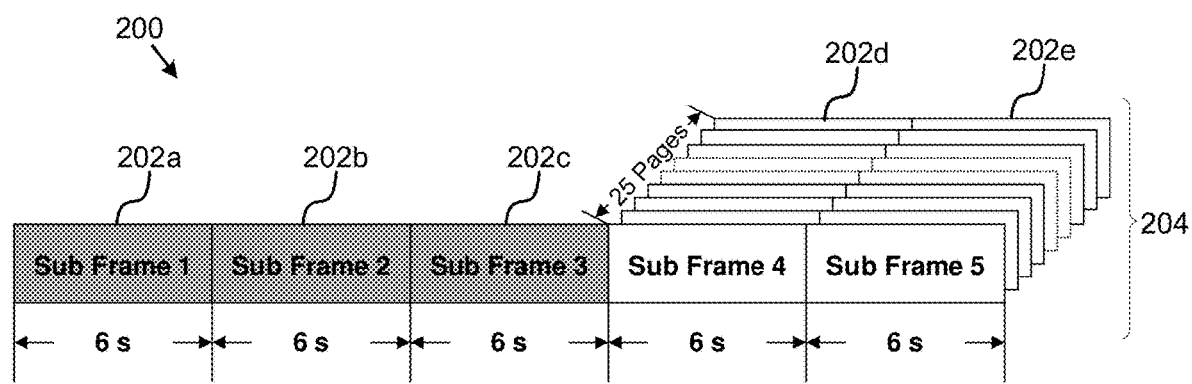
FIG. 2 illustrates a super-frame structure of GPS Civilian Navigation (CNAV) messages.

The GPS CNAV messages 204 may include five sub-frames 202 (each lasting 6 seconds) and one super-frame (lasting for 750 seconds) as depicted in FIG. 2. The first 3 sub-frames 202a-c, may be used for the receiver position fixing, and include the satellite ephemeris data. The data may be repeated every 30 seconds and updated every 2 hours in previous systems. The last 2 sub-frames 202d-e provide almanac data for each of the satellites in the form of 25 pages 204, with the content updated nominally every 6 days, although typically updated daily.

Despite the difference in the structure of NAV messages in GNSS systems compared to those in GPS, similarities include the fact that a super-set of NAV messages may include immediate (primarily ephemeris) data and non-immediate (primarily almanac) data. The immediate data is repeated at a much shorter period than the non-immediate data, and expires much sooner than the non-immediate data.

Depending on the accuracy of receiver time and the availability of previously collected ephemerides (the immediate data) when powered on, a GNSS UE might experience cold, warm or hot start, among which warm start is the most common case. In the widely accepted definition for warm start, no valid ephemeris data is available, but receiver time is roughly known at the startup.

Figure 3:
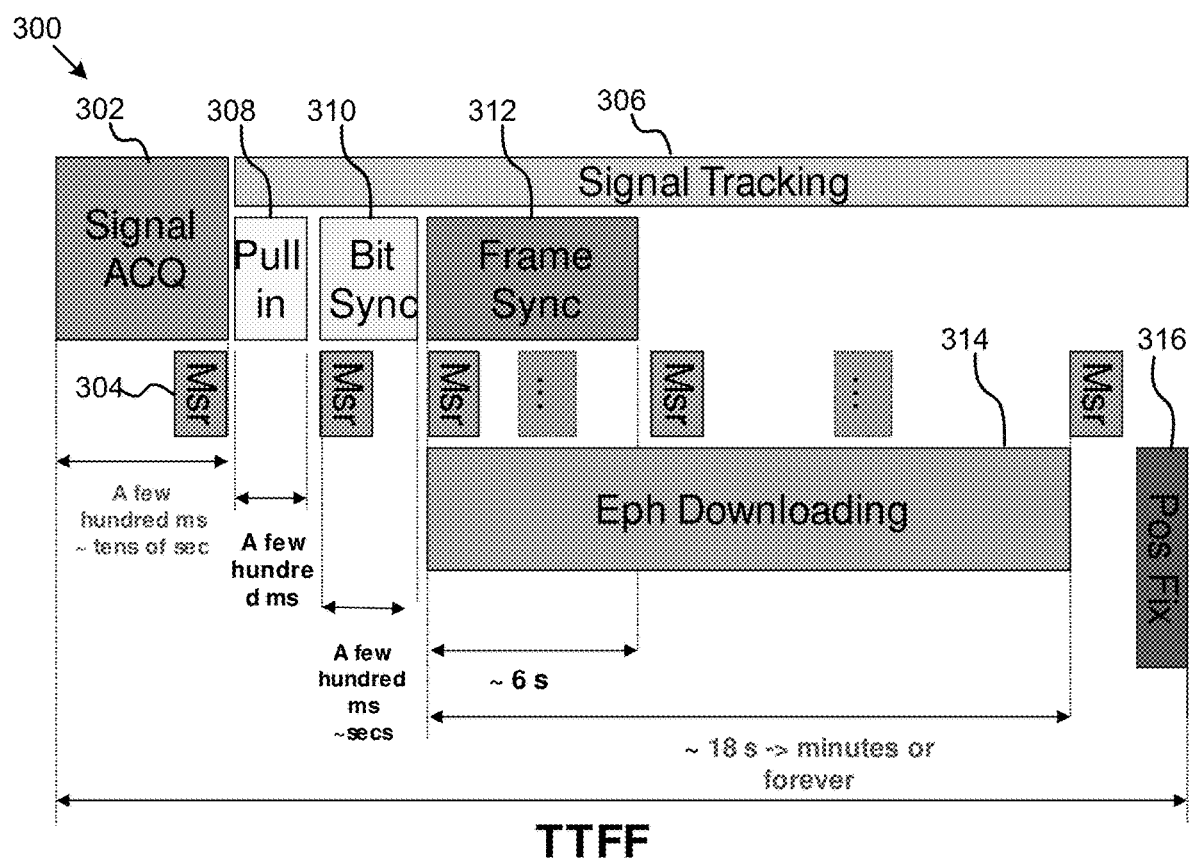
FIG. 3 illustrates a process of position fix on a standalone GPS UE.

As depicted in FIG. 3, a position fix process 300 on a standalone GNSS UE normally includes signal acquisition 302, tracking 306, bit synchronization 310, frame synchronization 312, ephemeris downloading 314, measurements taking 304 and position computation 316. In doing a regular warm start, the signal acquisition usually takes only a few hundred milliseconds for a GPS device in open sky environments. However, under weak signal conditions, the signal acquisition might take much longer (say a few tens of seconds) to finish the three-dimensional search in the time, frequency and signal level domains. Once the signal gets acquired, the tracking loop is activated, and immediately after signal is pulled in, the process of data bit synchronization is started. This process takes a few hundred milliseconds to several seconds depending on signal strengths and algorithm efficiency. In the stable tracking status, the navigation bits are collected one by one. Collecting a complete copy of ephemeris (sub-frames 1-3) takes about 18 seconds in open sky, and minutes or forever in weak signal environments due to increased bit error rate (BER) (see FIG. 4). As soon as the ephemeris data downloading from three to four satellites is completed, and the measurements are taken, the user position usually can be fixed immediately. Therefore, in weak signal environments, both the signal acquisition and ephemeris downloading take time, which slows the TTFF process, whereas in open sky, the primary obstacle to fast TTFF is the time needed for ephemeris data downloading.

For a GNSS UE in open sky on the earth surface, the received minimum signal level from GPS L1 is around −130 dBm, and a higher level is possible, but is not expected to exceed −125.5 dBm. For other GNSS signals, the nominal received signal levels are approximately same when compared with GPS. However, in some extreme cases, such as urban canyon, foliage and indoor environments, the signals finally arriving at receiver antenna could be heavily attenuated down by −30 dB or even more because of signal reflection, blockage and penetration. Working under such conditions is almost a mission impossible for receivers with normal tracking sensitivity, but is required for a high sensitivity receiver. The minimum TTFF and sensitivity performance conformance tests for AGPS has been given in 3GPP specifications, and it is actually common for some GNSS chips in industry to have solid navigation at signal level of −160 dBm and even further down to −163 dBm by different means of assistances.

Figure 4:
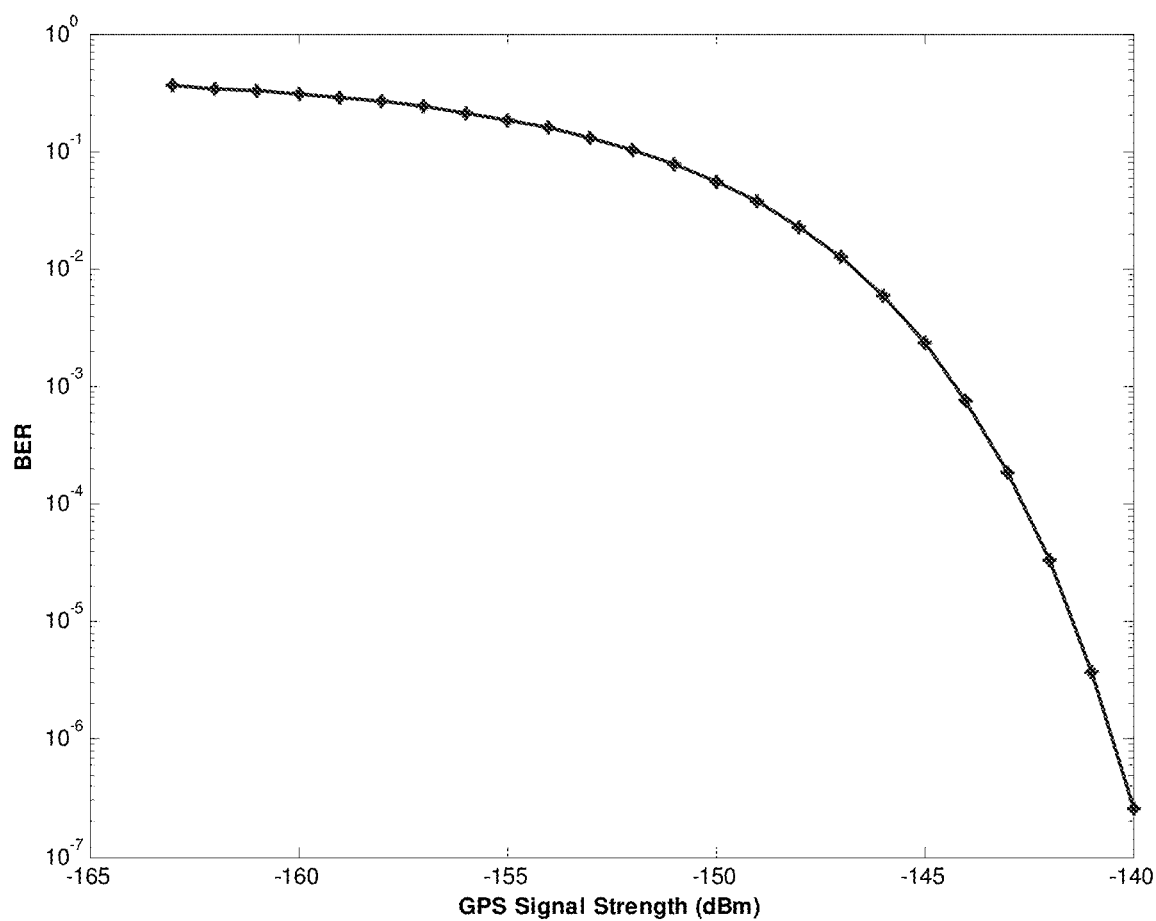
FIG. 4 illustrates theoretical Bit Error Rates (BER) with GPS signal strength.

When the GNSS signal strength drops to a certain level, it causes immediate difficulties in the GNSS receiver tracking loop and ephemeris data downloading. Firstly, the parameters of the tracking loop, designed for normal signal strengths, no longer have sufficient gain for signal detection or maintaining signal tracking. Secondly, BER increases with the decrease of signal strength, as depicted in FIG. 4. When the signal level drops below 27 dB-Hz, even if the signal tracking is maintained, it would be difficult for successful decoding of navigation messages, due to the high level of BER.

The sensitivity improvements of a GNSS receiver involve the efforts from antenna, RF front-end to baseband signal processing. In the baseband signal processing, in order to obtain adequate processing gain in Signal-to-Noise Ratio (SNR) for signal detection, combined coherent and non-coherent integrations are needed. However, non-coherent integration is subject to squaring loss (SL). Equation (1) gives an approximation to the processing gain combining coherent and non-coherent integrations. For a fixed total integration period ($T_I$) increasing the coherent period ($T_c$) is more efficient to get higher processing gain than non-coherent. However, without knowing the navigation bits, the coherent integration is limited within 1-bit period, namely 20 ms for GPS given the data rate of 50 bps.

$$\text{Gain(dB)} \approx 20 \cdot \log(\sqrt{T_c}) + 10 \cdot \log\left(\sqrt{\frac{T_I}{T_c}}\right) \quad (1)$$

To improve the sensitivity to −160 dBm, coherent integration over multiple bits is desired. Therefore, valid navigation bits as well as the bit boundaries are needed for data wipe-off. For this purpose, the previously collected navigation bits can be directly used if still valid; or the fresh navigation messages from different sources, including ephemeris and almanac, can be used to recover the navigation bits.

GNSS Assisting Technologies

The existing efforts of improving the TTFF and sensitivity on GNSS UEs can be categorized into two different approaches: (1) developing assisting systems, (2) inventing and implementing new algorithms for standalone UEs.

The concept of assisted GPS (AGPS) was brought up by industry in late 1990's, when lots of patents were filed, and then granted in early 2000's. Seeing the challenges of TTFF and sensitivity on standalone GPS devices, the general idea from the patents is to provide assisting information to GNSS UEs, such as time, rough location, a list of satellites in view, Doppler of each satellite, ephemeris, etc., in a way to speed up each stage in the process of position fix (FIG. 3). In a typical network-assisted AGPS system, a Serving Mobile Location Center (SMLC) is established to process the data (navigation messages) collected by the Wide Area Reference Network (WARN) and package the assistance data in Information Elements (IEs). Upon requests from GPS UEs, the SMLC sends out IEs through Mobile Switching Center (MSC) and Radio Network Controller (RNC), until finally arriving at the UEs. With a series of AGPS specifications embodied and continuously revised in the 3GPP and Open Mobile Alliance (OMA) standards since 2001, AGPS-enabled products then became popular in the GNSS market.

With additional assistance, the performance of fast TTFF and sensitivity on UEs can be further enhanced but it is a challenge when network connectivity is not available. A technology usually referred to as Ephemeris Extension (EE) enables fast TTFF and high sensitivity on GNSS UEs even without network connectivity. The EE technologies in most embodiments are based on orbital determination theories, and provide alternative ephemeris data with a validity period extended to a few days, rather than 2 hours for regular GPS ephemeris.

Limitations of Existing GNSS Assisting Technologies

In spite of the benefits on TTFF and sensitivity, the AGNSS and EE technologies have obvious limitations, as detailed in Table 1.

Building and maintaining the AGNSS infrastructure require tremendous efforts and continuous cost. Any AGNSS-capable navigation devices, unlike standalone GNSS devices, are tied to good signals from the subscriber cellular phone networks in order to get assistance data on time, which substantially limit their area of operation.

The EE technologies include server based and client based modes. The client based EE is good for standalone devices, but the accuracy is subject to the validity of the embedded earth orientation parameters (EOP), and the quantity and quality of the local data collection. The server based EE is able to provide better accuracy, but it also needs the supports from the global infrastructure for data collection and is subject to network connectivity.

TABLE 1

Comparison of AGNSS and EE in improving TTFF and Sensitivity

| | AGNSS | EE |
|---|---|---|
| Benefits | TTFF<br>Fast signal acquisition<br>Saving Eph downloading time<br>Sensitivity<br>To provide Eph when local eph downloading is not possible | Server/Client Based<br>TTFF<br>Saving Eph downloading time<br>Sensitivity<br>To provide Eph when local eph downloading is not possible<br>Server Based<br>Good accuracy<br>Client Based<br>No reliance on network connectivity |
| Limitations | Infrastructure development and maintenance<br>Reliance on network connectivity<br>Frequent data transferring over network; Subject to network bandwidth<br>Additional cost of data plan for end users<br>Transportation delay of assisting data<br>2 hour update rate | Server Based<br>Infrastructure development and maintenance<br>Reliance on network connectivity<br>Large data size to transfer over network; subject to network bandwidth<br>Additional cost of data plan for end users<br>Unusable for data aiding<br>Client Based<br>Subject to quantity/quality of local data collection<br>Susceptible to orbit maneuver and clock adjustment<br>Subject to validity of local earth orientation parameters (EOP)<br>Unusable for data aiding |

Table 1 shows that AGNSS and EE can only be beneficial under certain prerequisite conditions, such as network connectivity and data availability. Or in other words, even with the above technologies, fast TTFF and high sensitivity may still not be obtainable when those prerequisite conditions are not met, which does happen often in daily life. This is a long-felt industry problem, and enormous efforts have been spent for years by the industry to solve these issues.

One cause for these issues lies in the congenital weakness of the design of the existing GNSS NAV messages. Taking GPS as an example, the contents in GPS sub-frames 1-3 are updated every 2 hours, although the ephemeris is valid for up to 4 hours. It is challenging and questionable for standalone GPS devices in weak signal environments to catch up with such frequent ephemeris updates. Working properly in the past 2 hours does not mean that the UE can work properly in the next 2 hours, if ephemerides are not downloaded in time. The NAV messages received 2 hours ago cannot be used for the data aiding in the next 2 hours to improve the tracking sensitivity. For startups under normal signal conditions, the UEs, if missing the start of sub-frame 1, have to wait 30 s to get to the next sub-frame 1 in order to download a complete copy of the ephemeris. The successful startups 4 hours ago do not help much reduce the TTFF in the subsequent startups, as time needs to be spent again on downloading the ephemeris.

To some extent, all the efforts of the above technologies actually just attempt to improve the TTFF and sensitivity by overcoming the limited life period (2-4 hours) of the broadcast ephemeris. The longer the life of the broadcast ephemeris, the less the need for the above technologies.

Other embodiments may be applicable to the NAV messages for other GNSSs, like GLONASS, BeiDou and GALILEO. The GALILEO F/NAV, available on E5A-I channel at 25 bps, consists of 12 sub-frames lasting 600 s, with each sub-frame composed of 5 pages lasting 50 s. In these systems, the ephemeris data occupies 3 pages, lasting 30 seconds, taking a very similar form as GPS. The GALILEO ephemeris data includes 17 parameters, including 6 Keplerian parameters and 6 harmonic coefficients, with the content valid for up to 4 hours and updated every 3 hours. The downloading of GALILEO ephemeris takes at least 30 seconds, and if missing the start of the first ephemeris page, it will take at least 50 s to get a complete copy. So from this perspective, the GALILEO TTFF for standalone devices is expected to be slower than GPS.

For BeiDou, the D1 NAV message is broadcast at the rate of 50 bps, with the super-frame structure very similar to the GPS super-frame. The BeiDou D1 super-frame lasts for 12 minutes, consisting of 5 sub-frames, with the ephemeris and clock broadcast in the first 3 sub-frames and repeated every 30 s, and with the almanacs broadcast in the last 2 sub-frames in 24 pages. The BeiDou ephemeris is similar to the GPS ephemeris, occupying 3 sub-frames but it is updated every 1 hour and can be used for up to 2 hours. It is expected that for standalone BeiDou UEs, the TTFF is also similar to standalone GPS UEs.

For GLONASS, at the data rate of 50 bps, the super-frame has duration of 2.5 minutes and consists of 5 frames, with each lasting for 30 s and further consisting of 15 strings. Each string has duration of 2 seconds. The ephemeris, regarded as immediate data and repeated in every frame in the GLONASS navigation messages, occupies 5 strings and comprises the Cartesian coordinates, velocity components, and solar/lunar gravitational accelerations at the reference time, with the content valid over about 0.5 hour. Upon receiving the ephemeris, the navigation device is to calculate the satellite orbit by numerically integrating the motion equations that include the second zonal geopotential coefficients through a fourth-order Runge-Kutta method. The downloading of the GLONASS ephemeris takes at least 10 s, and if missing the start of the first ephemeris string, it will take at least 30 s to get a complete copy of the ephemeris. Therefore, on this point, the GLONASS TTFF for standalone devices is expected to be faster than GPS.

A summary of the NAV messages for GPS, GLONASS, BeiDou System and GALILEO is given in Table 3 for the purpose of comparison. It is in common that, the designed NAV messages for GPS, GLONASS, BeiDou and GALILEO are valid for short periods, and therefore all of them are subject to aforementioned limitations in attempts to improve TTFF and sensitivity, even with the assisting technologies and systems.

Embodiments of GNSS NAV Messages

The common weaknesses in the NAV messages of the GPS, GLONASS, BeiDou and GALILEO are described above. Those weaknesses can be overcome, and fast TTFF and high sensitivity can be facilitated through the use of improved NAV messages, as long as the following 'rules' are followed: (1) the update rate is as low as possible, (2) the repeat rate is as high as possible, (3) the length of Eph content is as short as possible, and (4) the Eph life expectancy is as long as possible.

In light of these four rules, GPS CNAV the primary contents in the GPS CNAV messages include: (1) satellite clock data, (2) satellite ephemeris data, (3) ionosphere information, (4) UTC parameters, and (4) Almanacs.

Currently, two types of atomic clocks, Rubidium and Cesium clocks, at the accuracies of $\pm 1 \times 10^{12} \sim \pm 1 \times 10^{13}$, are used on the GPS satellites. So it is possible to have the clock parameters updated at a longer interval, say 12 hours, without introducing significant errors in the pseudorange observations.

For the GPS ephemeris data, the Keplerian parameters are from the fitting of 4-hour orbit curves. The orbit, represented by the Keplerian parameters plus perturbation corrections, gives the overall best fitting performance of the whole orbit segment. But as a longer orbit curve is used in the fitting, it is harder for the fitted orbit to agree well with each small portion of the original orbit. A set of Keplerian orbital parameters can be a good description of the satellite orbit over a short period (say 4 hours), but can hardly be a good approximation of the orbit for a long period (say 24 hours). So frequent update of the ephemeris content is helpful in order to guarantee the orbit accuracy, and at this point, there is not much room to extend the ephemeris update interval (namely to reduce update frequency).

The ionosphere information included in the GPS CNAV messages is actually the Klobuchar model; the UTC parameters are for relating the GPS time with the UTC time; and the almanacs are the rough orbits for all GPS satellites in service. In some embodiments, all these messages are updated at least once every 6 days, and they are actually observed as often as once per day although the update time is not fixed on each day.

The analysis above indicates that only the ephemeris message (the Keplerian parameters) changes frequently when compared to all other GPS CNAV messages. To facilitate fast TTFF and high sensitivity, the present embodiments may minimize the frequency of the ephemeris update in the GPS CNAV messages, according to the aforementioned 'rules'.

The GLONASS ephemeris data gives a good estimate, although the life of the GLONASS ephemeris is only around 30 minutes. For a satellite in space, given the initial conditions (position r, velocity $\dot{r}$, and etc.) in Equation (3) at time $t_0$, the succeeding orbit, r(t), can be obtained by integrating the accelerations $\ddot{r}$ in Equation (4), as illustrated in Equation (5).

$$\begin{cases} r_0 = r(t_0) \\ \dot{r}_0 = \dot{r}(t_0) \\ \ldots \end{cases} \quad (3)$$

$$\ddot{r}(t) = -GM \frac{r}{|r|^3} + a(t, r, \dot{r}, p_0, \ldots) \quad (4)$$

$$r(t) = r(t_0) + \int_{t_0}^{t} \left[ \dot{r}(t_0) + \int_{t_0}^{t} \ddot{r}(t) dt \right] dt \quad (5)$$

To ensure the accuracy of the derived orbit, r(t), the forces that result in the acceleration, $\ddot{r}(t)$, on the satellites, are carefully modeled. The forces can be gravitational and non-gravitational. In some embodiments, a successful ephemeris extension for up to 5 days, with only the non-gravitation force-solar radiation ($p_0$), and the gravitational attractions from the Earth, the Sun and the Moon are modeled.

For all the above gravitational components, given that standard models are embedded on the mobile devices, they can be well modeled independently for years. As to the solar radiation, it is related to the reflectivity and attitude of solar panel of the satellite in space, and fortunately can also be well modeled, with some slow-varying and satellite dependent parameters. So, if a set of such parameter(s) along with the satellite position and velocity at certain accuracy levels can be provided once a longer period (say 1 day), the satellite orbit can be accurately derived on a standalone mobile device with some embedded force models.

At any epoch, the satellite position and velocity expressed in Cartesian form (r, $\dot{r}$) can be also identically expressed in Keplerian form through a set of elements (e, a, i, $\Omega$, $\omega$, $M_0$), where:

e Eccentricity of orbit
a Semi-major axis of orbit
i Inclination of orbital plane
$\Omega$ Longitude of the ascending node
$\omega$ Argument of perigee
$M_0$ Mean anomaly at epoch t The transformation back and forth between the Cartesian and the Keplerian forms is possible. However, when representing the satellite positions and velocities for different epochs in an orbital cycle through multiple sets of Keplerian elements, all the elements may be slow-varying quantities, except $M_0$, which satisfies the needs of the described NAV messages.

An embodiment of an improved GNSS NAV message is described in Table 2, which can well comply with the above 'rules' and can therefore inherently support fast TTFF and high sensitivity.

An update interval for each part of the described NAV messages in Table 2 is 1 day, but for the Almanac part, the update interval is possibly extended to a few days similar to GPS. In the ephemeris part, the present embodiment contains 6 basic Keplerian elements (e, a, i, $\Omega$, $\omega$, $M_0$) and 1 solar radiation parameter ($p_0$) for selected reference time $t_0$. Once the ephemeris is downloaded, the 6 Keplerian elements can be immediately transformed to Cartesian position $r(t_0)$ and velocity $\dot{r}(t_0)$, and then can be used as the initial condition to derive the entire orbit through Equation (5).

Figure 5:
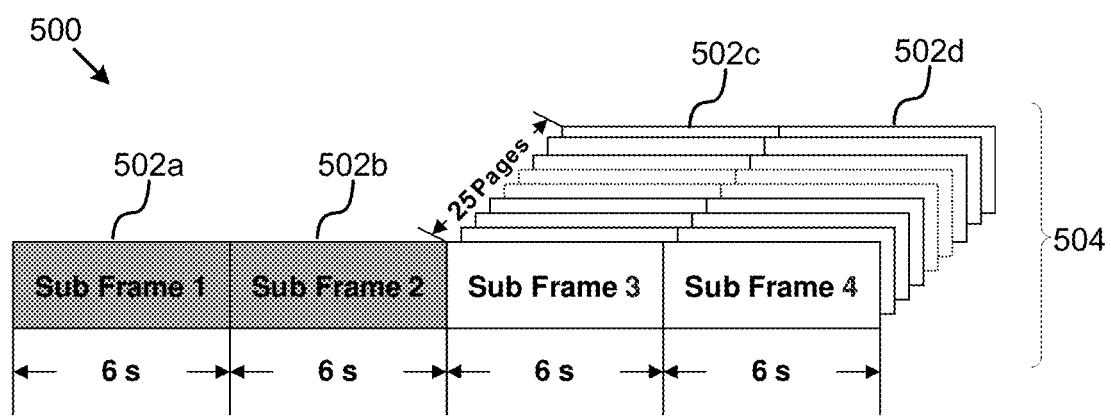
FIG. 5 illustrates an embodiment of a super-frame structure of one embodiment of GNSS NAV messages.

Compared with current GPS ephemeris, the embodiment of Table 2 contains much fewer parameters, therefore it is possible to have the new GNSS ephemeris and clock packed in only 2 sub-frames, assuming the same data rate, same word structure and same sub-frame length. For the remaining parts listed in Table 2, they can be packed into multiple pages of 2 more sub-frames, in a similar way as the pages of sub-frames 4 and 5 in current GPS CNAV messages shown in FIG. 2. Therefore, the super-frame structure of the proposed new GNSS NAV messages will look like what is depicted in FIG. 5, which includes a first two subframes 502*a-b* and 24 pages 504 of third and fourth subframes 502*c-d*.

With the embodiment of the NAV messages, it will take only around 12 seconds to download the ephemeris data, and it will just take 24 seconds to get next copy of the ephemeris even if missing the first sub-frame. If modulated on future GNSS signals, the messages can be repeatedly broadcasted in a whole day. As long as the ephemerides are downloaded from the satellites once in a day, the mobile GNSS devices can work properly without downloading any more in the rest time of the day. Compared with current NAV messages used in GPS, GLONASS, BeiDou and GALILEO systems, the present embodiments are advantageous, which can not only greatly reduce the TTFF of the devices, but also greatly extend the ability of standalone devices to work under weak signal environments.

Advantages of the Described NAV Messages

In Table 3, a comparison of the described NAV messages to GPS, GLONASS (GLO), BeiDou (BDS) and GALILEO (GAL) is given. For illustrative purposes, and for ease of convenience of comparisons, the same data rate (50 bps) and the same length of sub-frame (6 s) to GPS CNAV messages have been used for the new GNSS NAV messages. In such an embodiment, the length of Eph may be between 12 and 18 s. The repeat of Eph may be 24-30 s. Update of Eph data may occur every 24 hours with the described NAV method, as compared with 2 hours for all other methods. Similarly, the life of the Eph data is 24 hours with the described method as compared with the GPS, GLO, BDS, or GAL systems.

TABLE 2

Proposed Contents of New GNSS Navigation Messages

| No. | Items | Remarks |
|---|---|---|
| 1 | Satellite clock | Af0, af1, af2 |
| 2 | Satellite ephemeris | 6 Keplerian elements, 1 Solar radiation parameter |
| 3 | Ionosphere information | Klobuchar model |
| 4 | System Time Parameters | Relating this GNSS time to UTC Relating the time of this GNSS to other GNSSs |
| 5 | EOP data | Earth orientation parameters |
| 6 | Almanacs | Same form as GPS almanac |
| 7 | ... | ... |

TABLE 3

Comparison of the NAV messages for GPS/GLO/BDS(D1)/GAL (F/NAV)/New GNSS

| | GPS | GLO | BDS | GAL | New NAV |
|---|---|---|---|---|---|
| Data rate | 50 bps | 50 bps | 50 bps | 25 bps | 50 bps |
| Length of super-frame | 750 s | 150 s | 720 s | 600 s | 600 s |
| Length of sub-frame | 6 s | 30 s | 6 s | 50 s | 6 s |
| Length of Eph | 18 s | 10 s | 18 s | ~30 s | 12 s |
| Repeat of Eph | 30 s | 30 s | 30 s | 50 s | 24 s |
| Update of Eph | 2 hrs | 0.5 hr | 1 hr | 3 hrs | 24 hrs |
| Life of Eph | 4 hr | 0.5 hr | 2 hr | 4 hrs | >24 hrs |

Compared with other GNSS NAV messages, the described NAV messages have a smaller size but the contained ephemeris has a longer life, and as a whole, the described NAV messages just need to be updated once every 24 hours. To help understand the advantages of the described NAV messages, the following comparisons are made:

Standalone Devices, New GNSS vs. GPS

For any GNSS deploying the described NAV messages, the devices just need to download the ephemeris data from the satellites once in a day, whereas previous GPS devices need 12 times per day. In each downloading, it takes around 18 s for current GPS devices, whereas only around 12 s for the new GNSS devices. Therefore, the described NAV messages advantageous over the previous GPS.

Once a complete copy of the described NAV messages is downloaded, the devices can still have data aiding for tracking loops in the rest time of the whole day, even without network connections in weak signal environments. For current standalone GPS devices, however, they have to be in a strong signal environment to acquire fresh NAV messages every 2 hours. Otherwise there could be no position fix available in the next 2 hours due to the stale NAV bits and expired ephemerides. So from a sensitivity point of view, a GNSS with the described NAV messages will also have incomparable advantages over the GPS.

Assisted Devices, New GNSS vs. GPS

There are three purposes to have the assisting information for mobile devices: (1) to expedite signal acquisition, (2) to save time in ephemeris downloading, and (3) to have navigation bits for data aiding in tracking loop.

For assisted GPS devices and assisted GNSS devices with the described NAV messages, there is no much difference in the first aspect, as the assistance data, such as SV list, Doppler frequency, code phase, location and time, are common to both. For the second and third purposes the assistance data sent from the assisting network to the mobile devices are only needed once per day using the described NAV messages since they are updated only once per day. For assisted GPS devices, the assistance data are needed once every 2 hours, which means that GPS mobile devices need frequent network connectivity and more network bandwidth for data transportation. In addition, as the size of a GPS super-frame is larger than the super-frame of the proposed described NAV messages, the time delay in transporting the assisting data will be larger in GPS assisting network.

Current GNSS Devices, Standalone vs. Assisted

It is certain that the assisted GNSS devices outperform the standalone GNSS devices in terms of both TTFF and sensitivity. The performance difference in open sky primarily lies in TTFF, because AGNSS can always help save ephemeris downloading time. In weak signal environments, the TTFF difference becomes even larger as both signal acquisition and ephemeris downloading take much longer than usual time for standalone devices. With assistance data, both the acquisition and tracking sensitivities can be significantly improved. So it can be concluded that assisted GNSS devices always have advantages over standalone devices.

New GNSS Devices, Standalone vs. Assisted

When the new GNSS NAV messages are deployed, as the messages are only needed to be downloaded once in a day, the assisted devices mostly show advantage in the speed and sensitivity of signal acquisition. Since signal acquisition is difficult only when the signal becomes weaker below a certain level, the performance of standalone and assisted new GNSS devices are expected to be equivalent under normal signal conditions. Under weak signal conditions, as long as the NAV messages could be received once in a day, the performance in tracking sensitivities for both standalone and assisted devices are also expected to be almost equivalent. Therefore, with the described NAV messages, the performance difference between standalone and assisted devices is expected to be much less than that between current standalone and assisted GPS devices.

Methods of Operation with the Described NAV Messages

Figure 6:
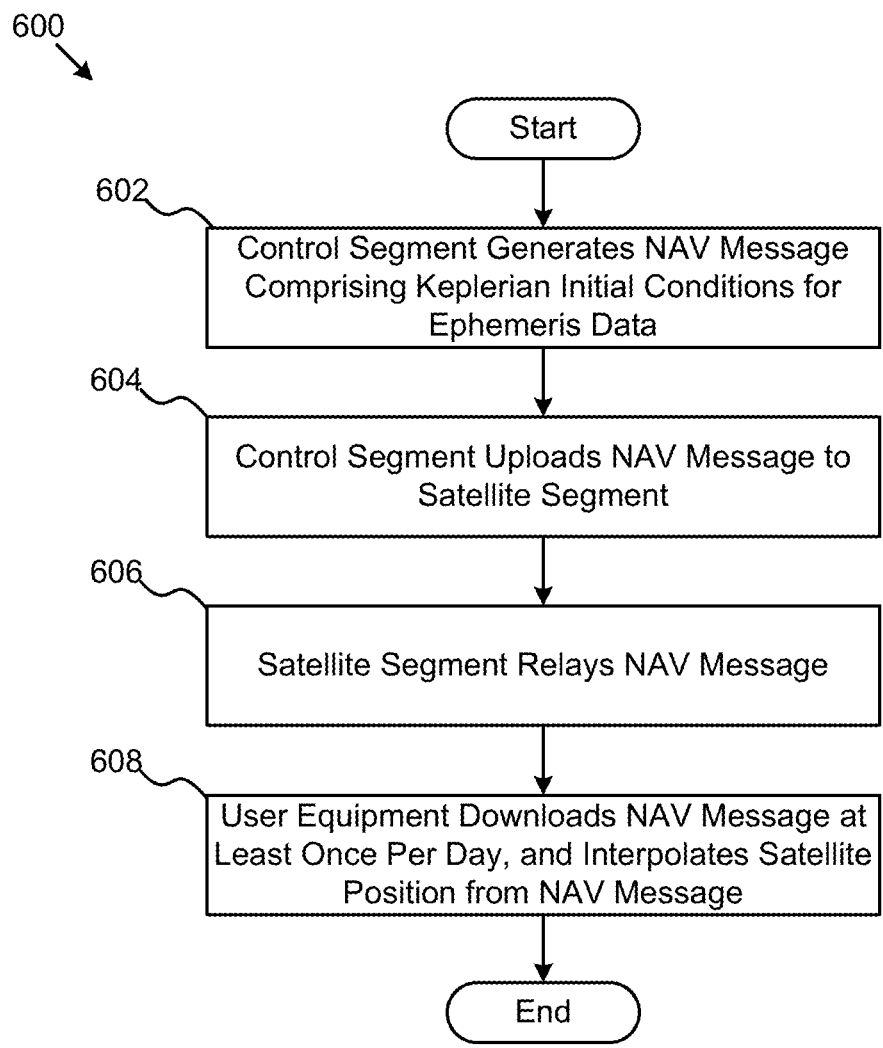
FIG. 6 is a flowchart diagram illustrating one embodiment of a method for inherent fast TTFF and high sensitivity.

In an embodiment, a method 600 for inherent fast TTFF and high sensitivity starts when the control segment generates a NAV message comprising Keplerian initial conditions for ephemeris data as shown at block 602. For example, the NAV message may be formatted according to the embodiment of Table 2. The control segment may then upload the NAV message to the satellite segment as shown at block 604. At block 606, the satellite segment relays the NAV message. The UE may then download the NAV message at least once per day, and interpolate the satellite position from information contained in the NAV message. Such an embodiment is illustrated in FIG. 6.

Figure 7:
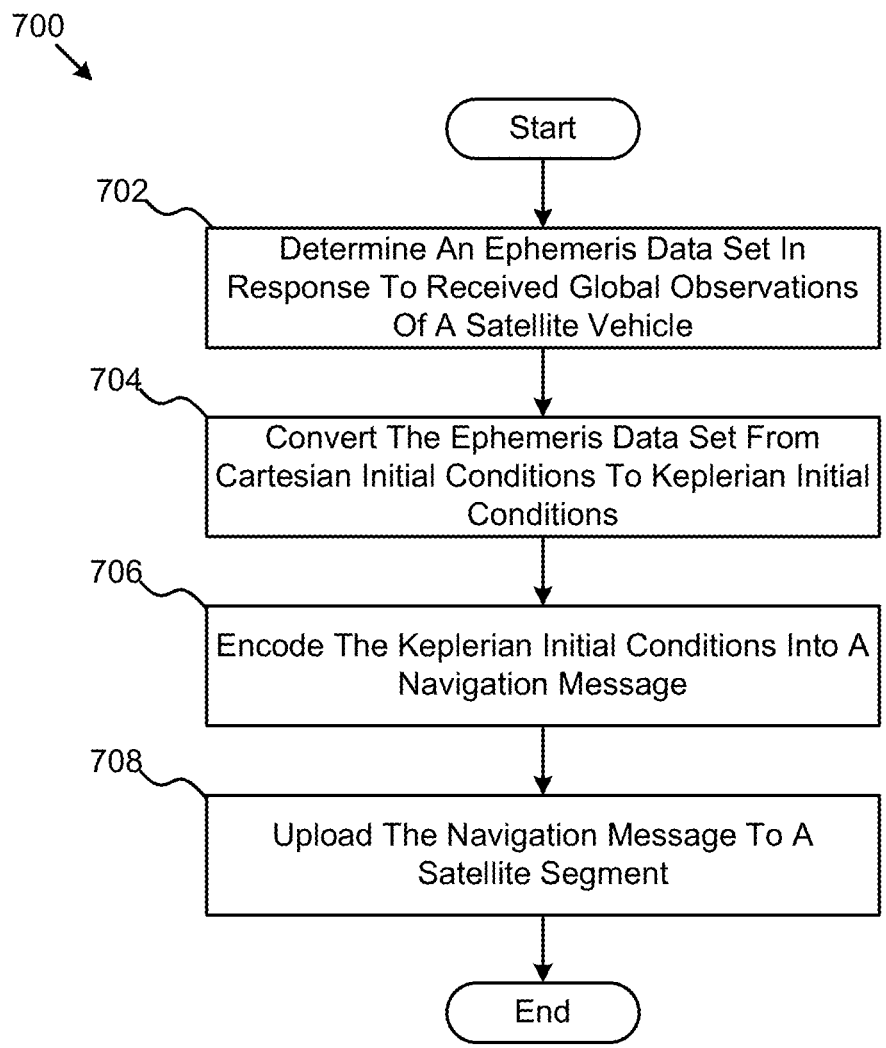
FIG. 7 is a flowchart diagram illustrating one embodiment of a method for inherent fast TTFF and high sensitivity.

FIG. 7 illustrates a method 700 for inherent fast TTFF and high sensitivity from the perspective of the CS 102. In the embodiment of FIG. 7, the CS 102 may determining an ephemeris data set in response to received global observations of a satellite vehicle at block 702. Additionally, the method 700 may include converting the ephemeris data set from Cartesian initial conditions to Keplerian initial conditions as shown at block 704. At block 706, the method 700 may include encoding the Keplerian initial conditions into a navigation message. Additionally, the method may include uploading the navigation message to a satellite segment as shown at block 708.

Figure 8:
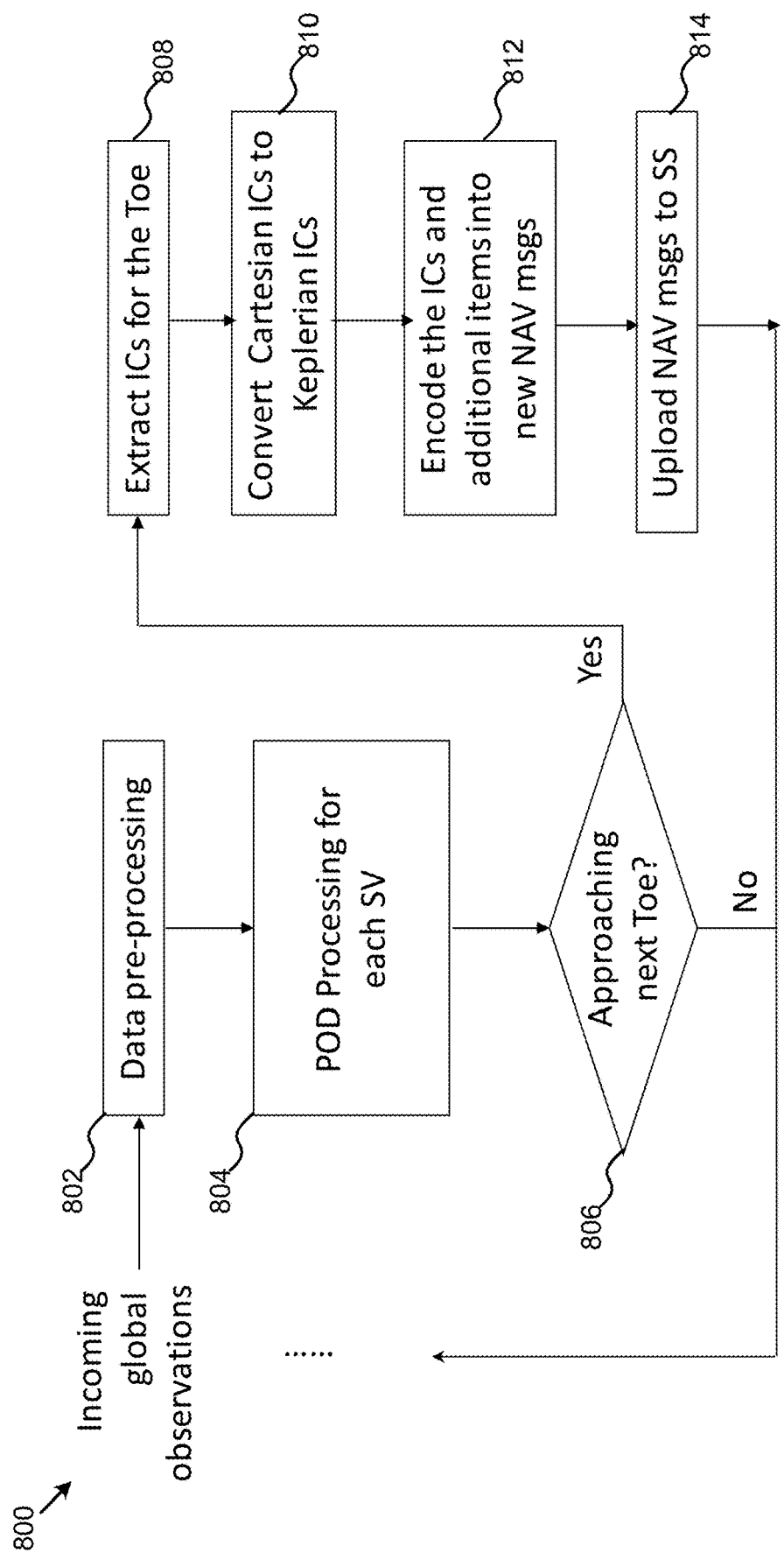
FIG. 8 is a flowchart diagram illustrating one embodiment of a method for inherent fast TTFF and high sensitivity.

FIG. 8 illustrates an embodiment of a portion of the method carried out by the control segment 102. In such an embodiment, a control server 110 may receive global observations and perform some pre-processing on the data to condition the data for Precise Orbital Determination (POD) processing as shown at block 802. Next, the server may then perform POD processing for each satellite vehicle observed as shown at block 804. If, at block 806, it is determined that the next reference time (Toe) is approaching, then the server may extract initial conditions for the Toe at block 808. The server may then convert Cartesian initial conditions to Keplerian initial conditions as shown at block 810. The initial conditions may then be encoded at block 812 and additional items may be packaged with the Keplerian initial conditions into a NAV message. The NAV messages may then be uploaded at block 814 to the satellite segment, and the process repeats.

Figure 9:
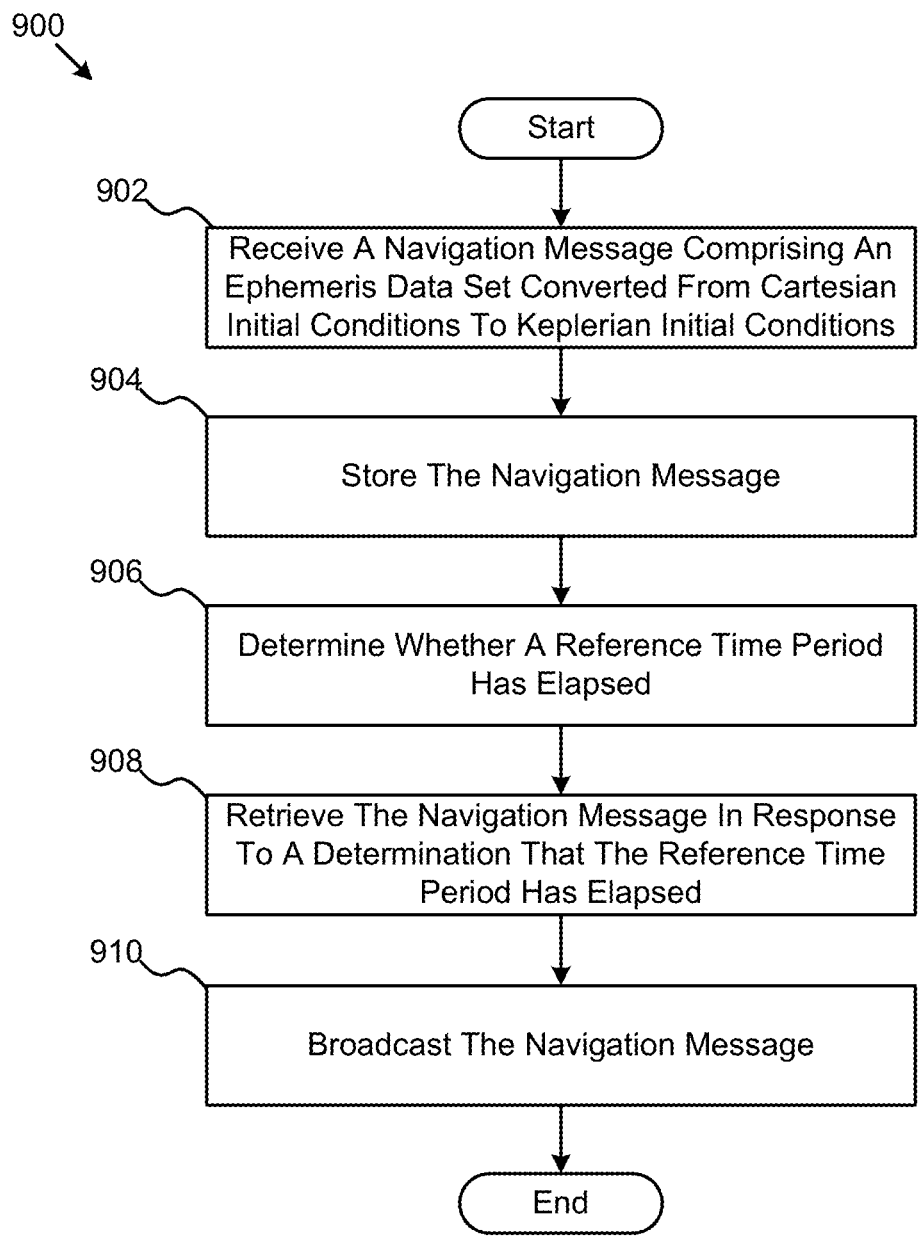
FIG. 9 is a flowchart diagram illustrating one embodiment of a method for inherent fast TTFF and high sensitivity.

FIG. 9 illustrates a method 900 for inherent fast TTFF and high sensitivity from the perspective of the SS 104. In an embodiment, the method 900 includes receiving a navigation message comprising an ephemeris data set converted from Cartesian initial conditions to Keplerian initial conditions, as shown at block 902. At block 904, the method 900 includes storing the navigation message. At block 906, the method 900 includes determining whether a reference time period has elapsed. At block 908, the method 900 includes retrieving the navigation message in response to a determination that the reference time period has elapsed. Additionally, at block 910 the method 900 includes broadcasting the navigation message.

Figure 10:
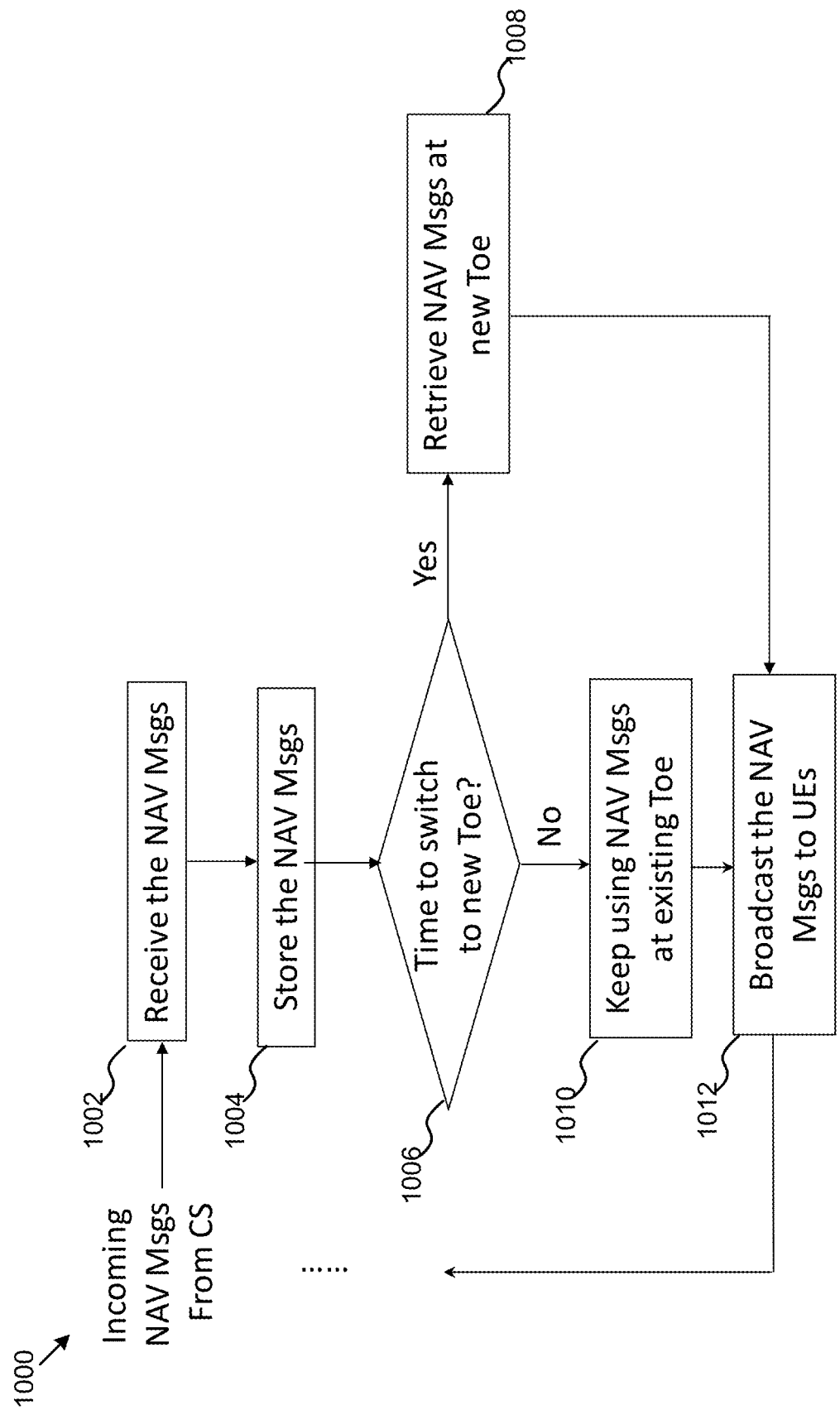
FIG. 10 is a flowchart diagram illustrating one embodiment of a method for inherent fast TTFF and high sensitivity.

FIG. 10 illustrates the process 1000 once the NAV message has been uploaded to the satellite segment 104. In an embodiment, the satellite may receive the NAV messages at 1002 and store the NAV messages at 1004 in an on-board data storage device, such as a memory. If, at 1006, it is determined that it is time to switch to a new Toe, then the NAV message is retrieved from storage and broadcast to UEs as shown at block 1008. If not, then the satellite system continues to keep using the NAV messages at the existing Toe at 1010. Further, the method may include broadcasting the nave messages to the UEs at block 1012. The process may repeat.

Figure 11:
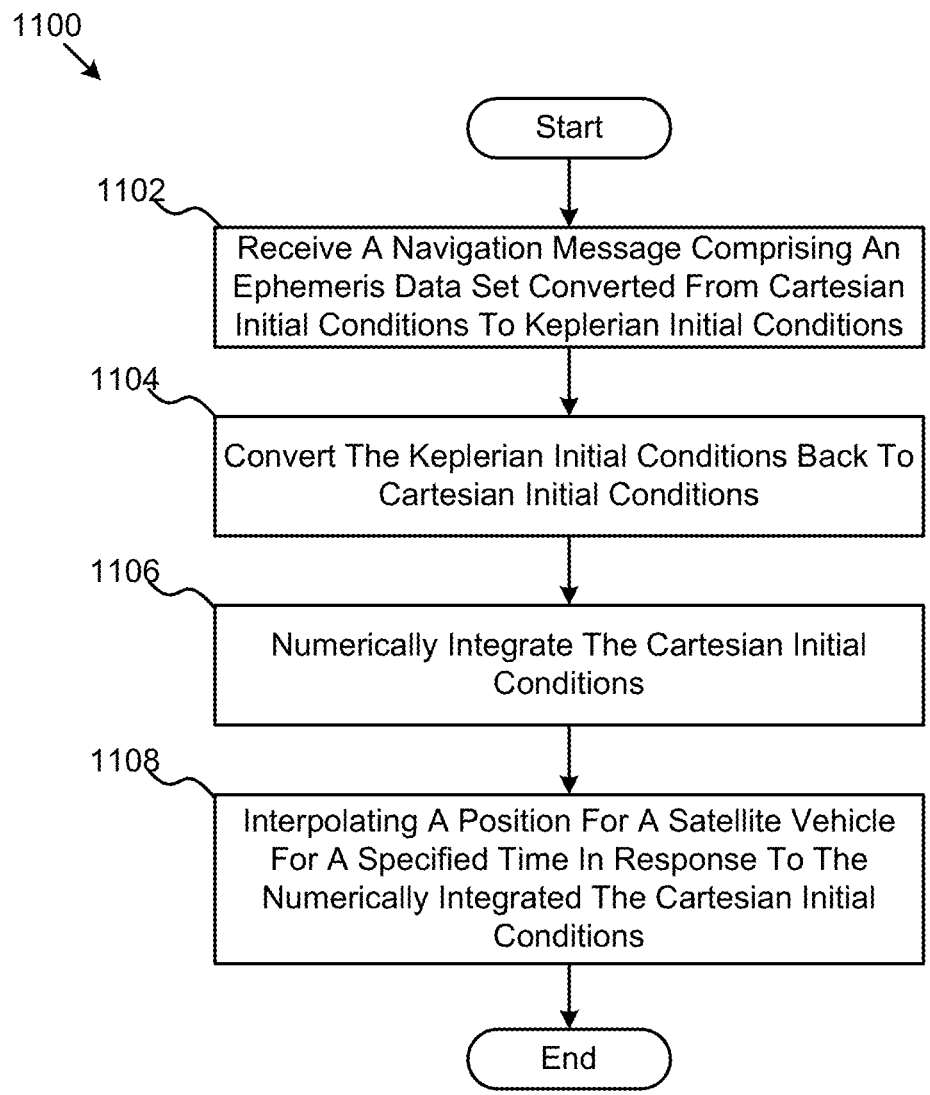
FIG. 11 is a flowchart diagram illustrating one embodiment of a method for inherent fast TTFF and high sensitivity.

FIG. 11 illustrates a method 1100 for inherent fast TTFF and high sensitivity from the perspective of the UE 116. In an embodiment, the method 1100 may include receiving a navigation message comprising an ephemeris data set converted from Cartesian initial conditions to Keplerian initial conditions as shown at block 1102. At block 1104, the method 1100 may include converting the Keplerian initial conditions back to Cartesian initial conditions. At block 1106, the method 1100 includes numerically integrating the Cartesian initial conditions. At block 1108, the method includes interpolating a position for a satellite vehicle for a specified time in response to the numerically integrated the Cartesian initial conditions.

Figure 12:
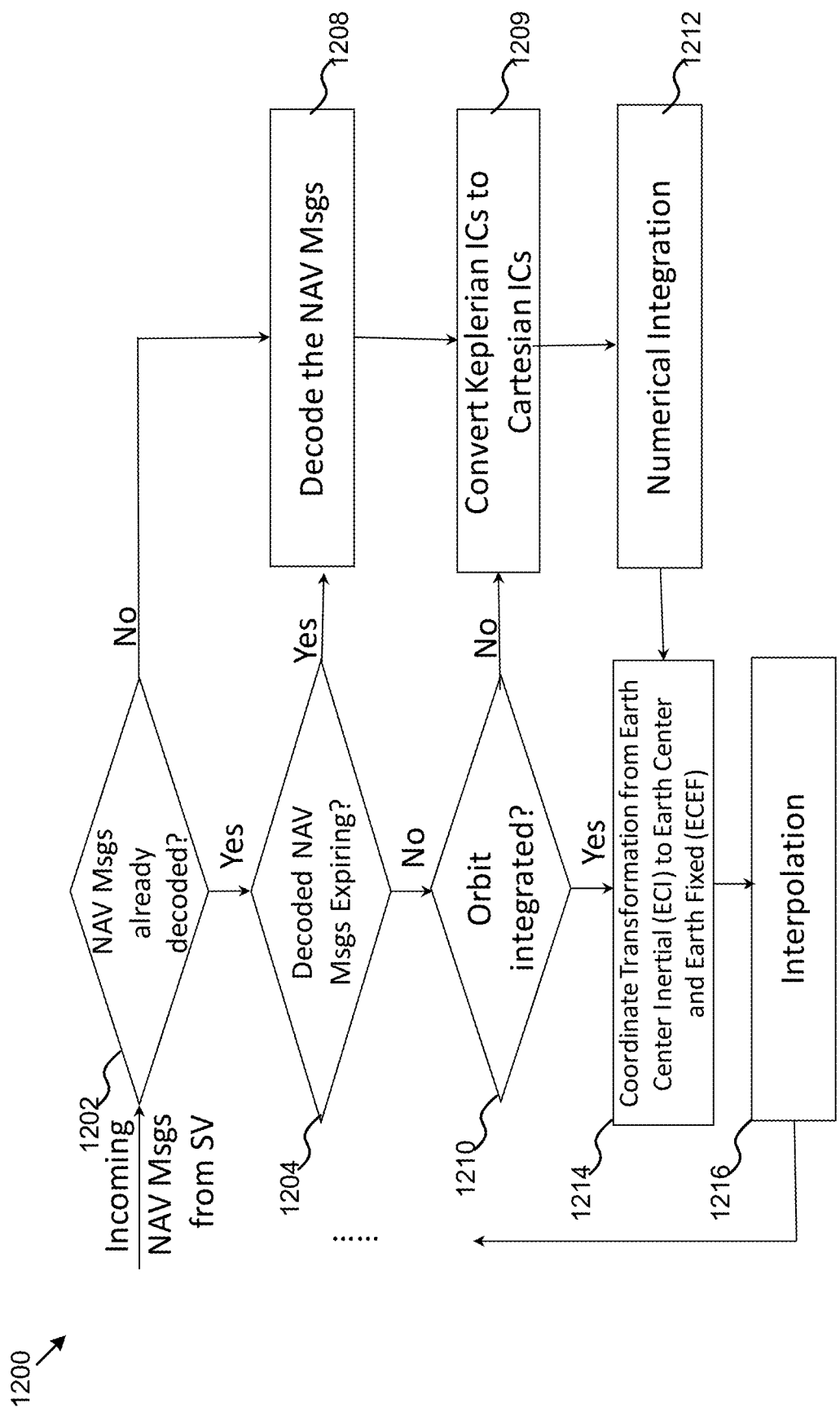
FIG. 12 is a flowchart diagram illustrating one embodiment of a method for inherent fast TTFF and high sensitivity.

FIG. 12 illustrates operations conducted at the UE 116. In an embodiment, the method 1200 includes receiving the NAV message from the satellite vehicle. If, at 1202, the NAV message is not already decoded, or if, at 1204, the decoded NAV message is expiring, then the UE decodes the NAV message at 1208. If, at 1210, the Orbit is not already integrated, then the UE may convert, at 1209, the Keplerian initial conditions back to Cartesian initial conditions and numerically integrate at 1212 the initial conditions. The UE may then coordinate transformation from Earth Center Inertial (ECI) to Earth Center and Earth Fixed (ECEF) position data at 1214. The satellite position may then be interpolated at 1216 from the calculated data, and the UE may establish a signal fix on the satellite.

The blocks illustrated in FIGS. 6-12 may be functional blocks of a software application, an application specific integrated chip (ASIC), a programmable logic chip (PLC), or the like. In some embodiments, the functional blocks may comprise computer readable code configured to be executed by a computer or information handling system, such as the NAV information handling system 1300 illustrated in FIG. 13.

Figure 13:
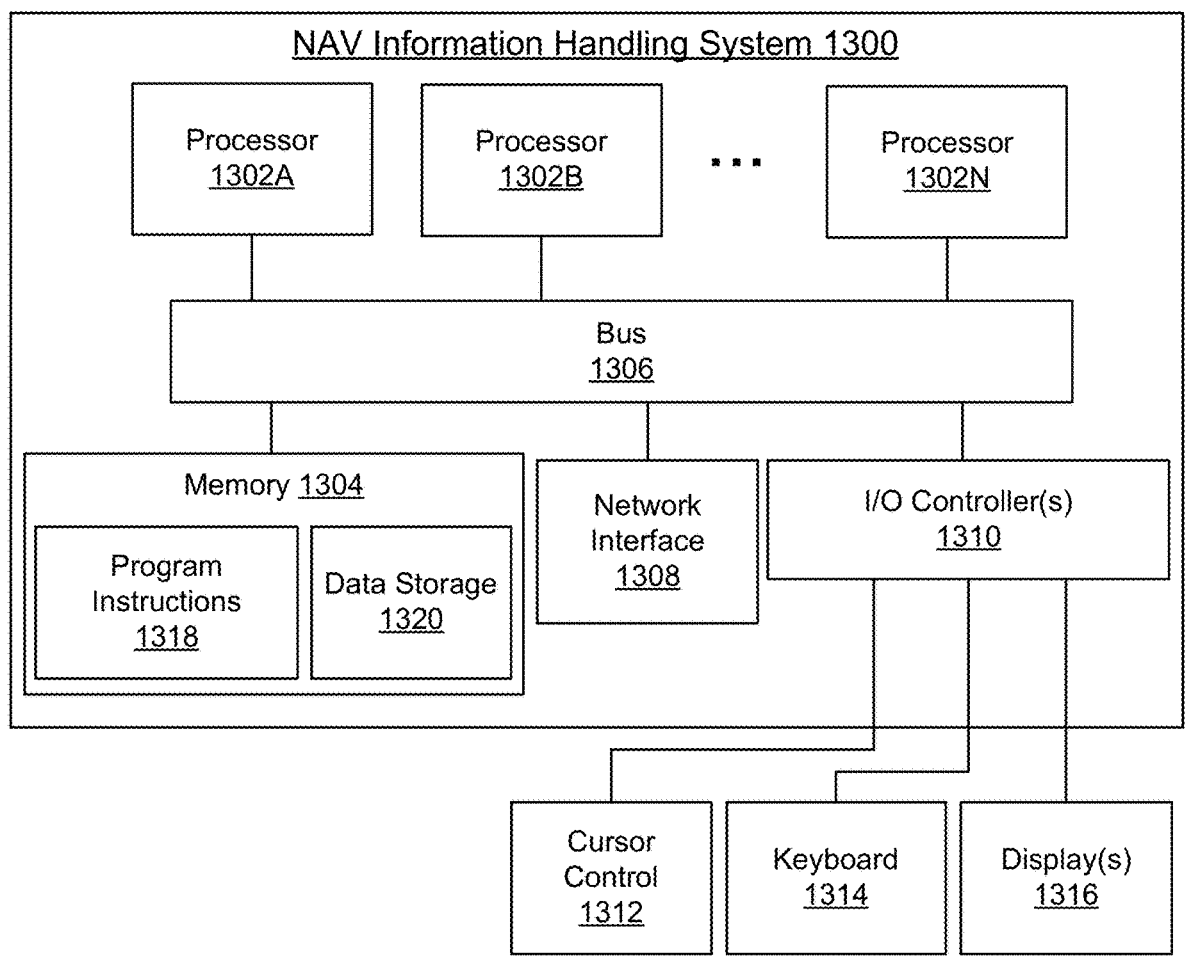
FIG. 13 is a schematic block diagram illustrating one embodiment of a navigation information handling system configured for inherent fast TTFF and high sensitivity.

FIG. 13 is a schematic block diagram illustrating one embodiment of a computer system 1300 configurable for inherent fast TTFF and high sensitivity. In one embodiment, components of the CS 102 may be implemented on a computer system similar to the computer system 1300 described in FIG. 13. Similarly, components of the SS 104 may be implemented on a computer system similar to the computer system 1300 described in FIG. 13. Components of the endpoint segment 106, including the UE 116 may also be implemented on a computer system similar to the computer system 1300. In various embodiments, computer system 1300 may be a server, a mainframe computer system, a workstation, a network computer, a desktop computer, a laptop, or the like.

As illustrated, computer system 1300 includes one or more processors 1302A-N coupled to a system memory 1304 via bus 1306. Computer system 1300 further includes network interface 1308 coupled to bus 1306, and input/output (I/O) controller(s) 1310, coupled to devices such as cursor control device 1312, keyboard 1314, and display(s) 1316. In some embodiments, a given entity (e.g., UE 116) may be implemented using a single instance of computer system 1300, while in other embodiments multiple such systems, or multiple nodes making up computer system 1300, may be configured to host different portions or instances of embodiments (e.g., POD and NAV message encoding system 110).

In various embodiments, computer system 1300 may be a single-processor system including one processor 1302A, or a multi-processor system including two or more processors 1302A-N (e.g., two, four, eight, or another suitable number). Processor(s) 1302A-N may be any processor capable of executing program instructions. For example, in various embodiments, processor(s) 1302A-N may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processor(s) 1302A-N may commonly, but not necessarily, implement the same ISA. Also, in some embodiments, at least one processor(s) 1302A-N may be a graphics processing unit (GPU) or other dedicated graphics-rendering device.

System memory 1304 may be configured to store program instructions and/or data accessible by processor(s) 1302A-N. For example, memory 1304 may be used to store software program and/or database shown in FIGS. 6-12. In various embodiments, system memory 1304 may be implemented using any suitable memory technology, such as static random access memory (SRAM), synchronous dynamic RAM (SDRAM), nonvolatile/Flash-type memory, or any other type of memory. As illustrated, program instructions and data implementing certain operations, such as, for example, those described above, may be stored within system memory 1304 as program instructions 1318 and data storage 1320, respectively. In other embodiments, program instructions and/or data may be received, sent or stored upon different types of computer-accessible media or on similar media separate from system memory 1304 or computer system 1300. Generally speaking, a computer-accessible medium may include any tangible, non-transitory storage media or memory media such as electronic, magnetic, or optical media—e.g., disk or CD/DVD-ROM coupled to computer system 1300 via bus 1306, or non-volatile memory storage (e.g., "flash" memory)

In an embodiment, bus 1306 may be configured to coordinate I/O traffic between processor 1302, system memory 1304, and any peripheral devices including network interface 1308 or other peripheral interfaces, connected via I/O controller(s) 1310. In some embodiments, bus 1306 may perform any necessary protocol, timing or other data transformations to convert data signals from one component (e.g., system memory 1304) into a format suitable for use by another component (e.g., processor(s) 1302A-N). In some embodiments, bus 1306 may include support for devices attached through various types of peripheral buses, such as a variant of the Peripheral Component Interconnect (PCI) bus standard or the Universal Serial Bus (USB) standard, for example. In some embodiments, the operations of bus 1306 may be split into two or more separate components, such as a north bridge and a south bridge, for example. In addition, in some embodiments some or all of the operations of bus 1306, such as an interface to system memory 1304, may be incorporated directly into processor(s) 1302A-N.

Network interface 1308 may be configured to allow data to be exchanged between NAV information handling system 1300 and other devices, such as other computer systems attached to ground terminal 112 or UE 116, for example. In various embodiments, network interface 1308 may support communication via wired or wireless general data networks, such as any suitable type of Ethernet network, for example;

via telecommunications/telephony networks such as analog voice networks or digital fiber communications networks; via storage area networks such as Fiber Channel SANs, or via any other suitable type of network and/or protocol.

I/O controller(s) 1310 may, in some embodiments, enable connection to one or more display terminals, keyboards, keypads, touch screens, scanning devices, voice or optical recognition devices, or any other devices suitable for entering or retrieving data by one or more NAV information handling system 1300. Multiple input/output devices may be present in NAV information handling system 1300 or may be distributed on various nodes of NAV information handling system 1300. In some embodiments, similar I/O devices may be separate from NAV information handling system 1300 and may interact with NAV information handling system 1300 through a wired or wireless connection, such as over network interface 1308.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

As shown in FIG. 13, memory 1304 may include program instructions 1318, configured to implement certain embodiments described herein, and data storage 1320, comprising various data accessible by program instructions 1318. In an embodiment, program instructions 1318 may include software elements of embodiments illustrated in FIG. 6-12. For example, program instructions 1318 may be implemented in various embodiments using any desired programming language, scripting language, or combination of programming languages and/or scripting languages. Data storage 1320 may include data that may be used in these embodiments such as, for example, UE 116. In other embodiments, other or different software elements and data may be included.

A person of ordinary skill in the art will appreciate that NAV information handling system 1300 is merely illustrative and is not intended to limit the scope of the disclosure described herein. In particular, the NAV information handling system 1300 and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be performed and/or other additional operations may be available. Accordingly, systems and methods described herein may be implemented or executed with other NAV information handling system 1300 configurations.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method for inherent fast Time To First position Fix (TTFF) and high sensitivity, comprising:
    obtaining an ephemeris data set at a control segment system;
    converting the ephemeris data set between Cartesian initial conditions and Keplerian initial conditions using a processing component of the control segment system;
    interpolating a satellite position in response to a navigation message having initial conditions for satellite ephemeris data converted into Keplerian format using the processing component of the control segment system;
    wherein signal fixation is maintained in response to receiving the navigation signal at least once per day.

2. The method of claim 1, further comprising:
    determining the ephemeris data set in response to received global observations of a satellite vehicle at a control segment at the control segment system;
    converting the ephemeris data set from Cartesian initial conditions to Keplerian initial conditions using the processing component of the control segment system;
    encoding the Keplerian initial conditions into a navigation message using the processing component of the control segment system; and
    uploading the navigation message to a satellite segment.

3. The method of claim 2, wherein determining the ephemeris data set further comprises performing a Precise Orbital Determination (POD) process on the received global observations using the processing component of the ground segment system.

4. The method of claim 3, further comprising preprocessing the received global observations before performing the POD process using the processing component of the ground segment system.

5. The method of claim 1, further comprising:
receiving the navigation message comprising the ephemeris data set converted from Cartesian initial conditions to Keplerian initial conditions at a satellite segment system;
storing the navigation message using a processing component and a data storage component of the satellite segment system;
determining whether a reference time period has elapsed using the processing component of the satellite segment system;
retrieving the navigation message in response to a determination that the reference time period has elapsed; and
broadcasting the navigation message using a data communication component of the satellite segment system.

6. The method of claim 1, further comprising:
receiving the navigation message comprising the ephemeris data set converted from Cartesian initial conditions to Keplerian initial conditions at an endpoint segment;
converting the Keplerian initial conditions back to Cartesian initial conditions using a processing component of the endpoint segment;
numerically integrating the Cartesian initial conditions using the processing component of the endpoint segment; and
interpolating a position for a satellite vehicle for a specified time in response to the numerically integrated the Cartesian initial conditions using the processing component of the endpoint segment.

7. The method of claim 6, further comprising decoding the navigation message.

8. The method of claim 6 further comprising transforming the numerical integration data from Earth Center Inertial (ECI) to Earth Center and Earth Fixed (ECEF) format.

9. The methods of claim 6, wherein the navigation message comprises satellite clock data.

10. The methods of claim 6, wherein the navigation message comprises six Keplerian elements.

11. The methods of claim 6, wherein the navigation message comprises a Solar radiation parameter.

12. The methods of claim 6, wherein the navigation message comprises ionosphere information.

13. The methods of claim 6, wherein the navigation message comprises system time parameters.

14. The methods of claim 6, wherein the navigation message comprises Earth orientation parameters.

15. The methods of claim 6, wherein the navigation message comprises Almanac data.

16. A system for inherent fast Time To First position Fix (TTFF) and high sensitivity, comprising:
a control segment configured to:
obtain an ephemeris data set;
convert the ephemeris data set between Cartesian initial conditions and Keplerian initial conditions; and
an endpoint segment configured to interpolate a satellite position in response to a navigation message having initial conditions for satellite ephemeris data converted into Keplerian format;
wherein signal fixation is maintained in response to receiving the navigation signal at least once per day.

17. The system of claim 16, wherein the control segment is further configured to:
determine the ephemeris data set in response to received global observations of a satellite vehicle;
convert the ephemeris data set from Cartesian initial conditions to Keplerian initial conditions;
encode the Keplerian initial conditions into a navigation message; and
upload the navigation message to a satellite segment.

18. The system of claim 16, wherein the space segment is further configured to:
receive the navigation message comprising the ephemeris data set converted from Cartesian initial conditions to Keplerian initial conditions;
store the navigation message;
determine whether a reference time period has elapsed;
retrieve the navigation message in response to a determination that the reference time period has elapsed; and
broadcast the navigation message.

19. The system of claim 16, wherein the endpoint segment is further configured to:
receive the navigation message comprising the ephemeris data set converted from Cartesian initial conditions to Keplerian initial conditions;
convert the Keplerian initial conditions back to Cartesian initial conditions;
numerically integrate the Cartesian initial conditions; and
interpolate a position for a satellite vehicle for a specified time in response to the numerically integrated the Cartesian initial conditions.

* * * * *